R. KROEDEL.
PHOTOGRAPHIC FILM WINDING MECHANISM.
APPLICATION FILED OCT. 12, 1917.
1,360,538.
Patented Nov. 30, 1920.
2 SHEETS—SHEET 1.
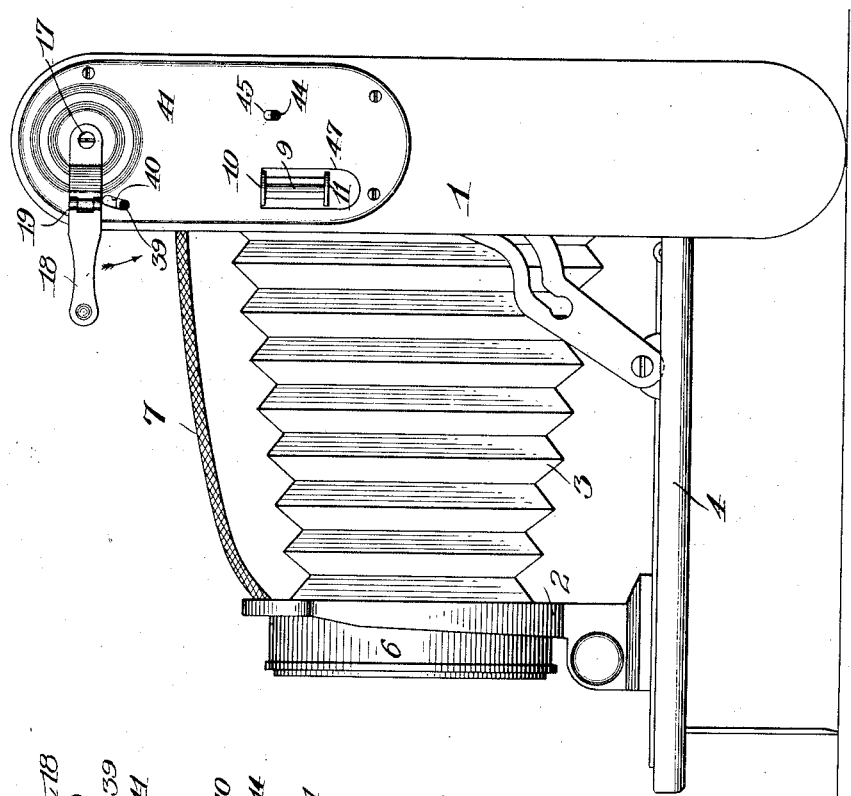
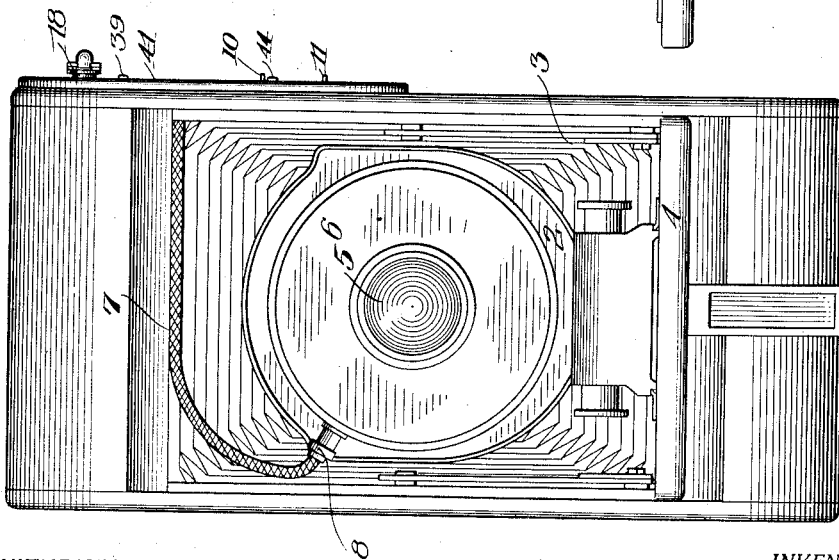
WITNESSES:
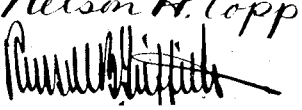
INVENTOR.
Robert Kroedel
BY
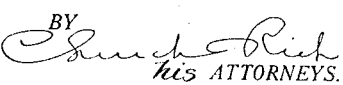
his ATTORNEYS.

R. KROEDEL.
PHOTOGRAPHIC FILM WINDING MECHANISM.
APPLICATION FILED OCT. 12, 1917.
1,360,538.
Patented Nov. 30, 1920.
2 SHEETS—SHEET 2.
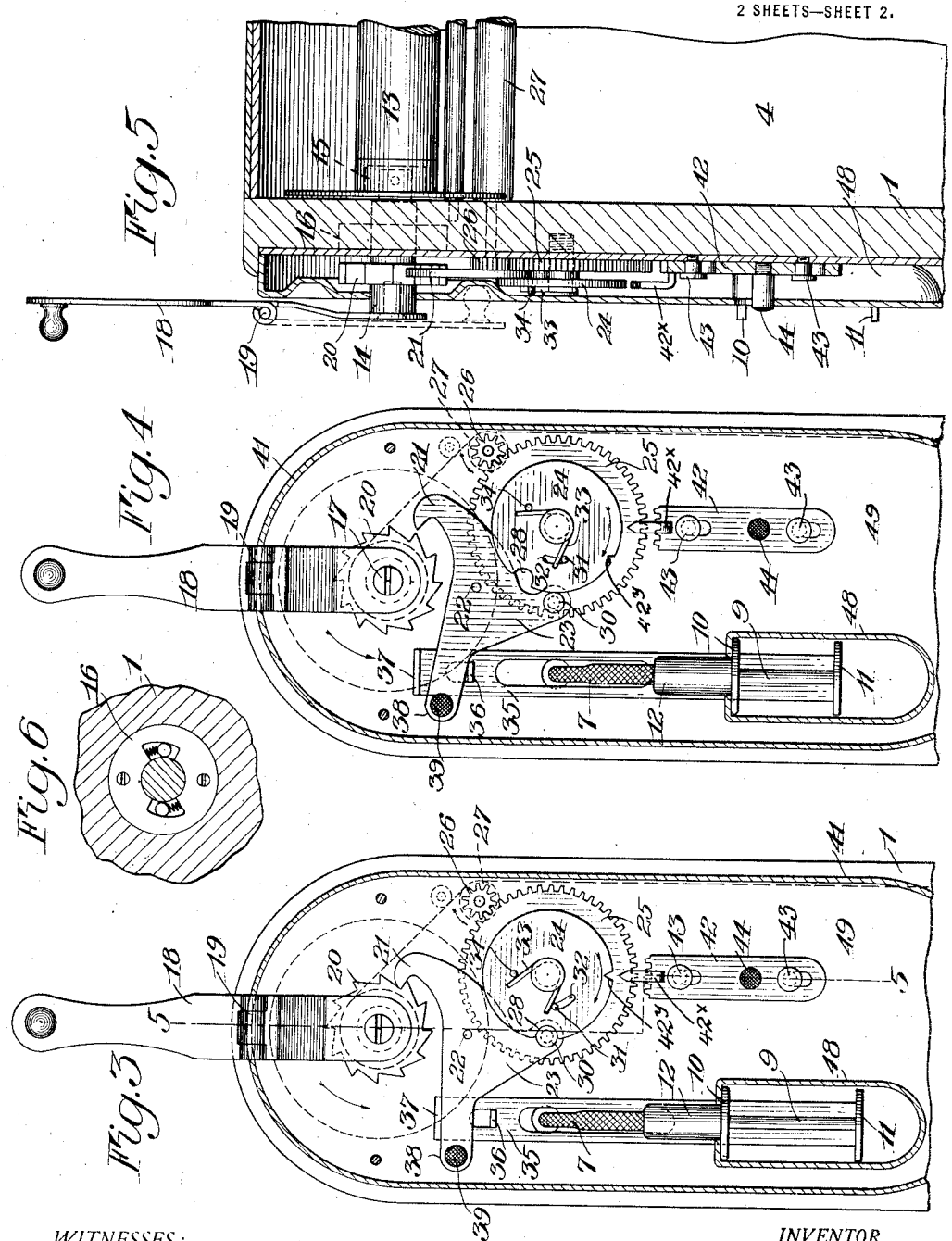

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM-WINDING MECHANISM.

1,360,538.  Specification of Letters Patent.  Patented Nov. 30, 1920.

Application fil d October 12, 1917. Serial No. 196,168.

*To all whom it may concern:*

Be it known that I, ROBERT KROEDEL, of Rochester, in the county of Monroe and State of New York, have invented certain new and useful Improvements in Photographic-Film-Winding Mechanisms; and I do hereby declare the following to be a full, clear, and exact description of the same, reference being had to the accompanying drawings, forming a part of this specification and to the reference-numerals marked thereon.

My present invention relates to photography and more particularly to photographic film cameras and it has for its object to facilitate the quick winding of the film while at the same time placing it under the automatic control of the shutter so that the latter cannot be operated until preceded by a winding movement and the winding movement cannot be performed until an operation of the shutter has intervened between it and the previous winding movement to the end that both double exposures and wastage of the film may not occur. To these and other ends the invention resides in certain improvements and combinations of parts all as will be hereinafter more fully described, the novel features being pointed out in the claims at the end of the specification.

In the drawings:

Figure 1 is a front elevation of a film camera constructed in accordance with and illustrating one embodiment of my invention;

Fig. 2 is a side elevation thereof;

Fig. 3 is an enlarged fragmentary view of the winding mechanism taken in section through its casing and showing the parts set ready for an exposure;

Fig. 4 is a similar view showing the positions of the parts after the actuation of the shutter;

Fig. 5 is a section taken substantially on the line 5—5 of Fig. 3, and

Fig. 6 is an enlarged detail section of the winding clutch.

Similar reference numerals throughout the several views indicate the same parts.

In the present embodiment of the invention, the camera proper comprises a body 1 and a front 2 connected by a bellows 3, the front being movable on a bed 4. The front carries the lens 5 within a shutter, the annular casing of which is indicated at 6. The shutter is adapted to be actuated from a distant point by a device known as a cable release that is well known in the art. It comprises, generally, a flexible tube or casing 7 fixed to the shutter casing 6 at 8 and containing a cable or thrust member 9 that is incompressible and adapted to exert a thrust against a suitable controlling part of the shutter mechanism. The casing 7 is inextensible and absorbs the reaction. The cable 7 terminates in a fixed finger-piece 10 secured to the side of the body 1 and the thrust member 9 terminates in a finger-piece 11 movable toward and from the finger-piece 10. The shutter is operated by pinching together the two finger-pieces and the thrust member 9 is retracted to normal position by a spring (not shown) within a barrel 12 fixed to the finger-piece 10. The casing 7 passes through an aperture in the wall of the body 1 and across the bellows chamber of the camera to the point of attachment 8 with the shutter.

The camera is fitted with the usual pair of film spools and in Fig. 5 the winding spool or roll is shown at 13. The spool is turned by a key 14 having an enlarged head 15 fitting within its slotted end. A familiar type of ball clutch indicated at 16 and shown in Fig. 6 encircles the key to prevent it from turning in other than one direction and unwinding the film from the spool. Fixed to the outer end of the key as by the screw 17 is a crank 18 that preferably folds as shown in dotted lines in Fig. 5, being fitted with an intermediate knuckle or hinge 19. The key carries a ratchet wheel 20 that is adapted to be engaged in the manner shown in Fig. 3 by a pawl 21 pivoted at 22 to lock it against winding movement. An arm 23 on the pawl rides on the periphery of a disk 24 carried by a gear 25. This gear meshes with a pinion 26 on a measuring roll 27 that is driven by the film as it passes from the supply to the winding spools. A given number of revolutions, therefore, of the measuring roll gear pinion and disk indicate that the required amount of film has been fed for one exposure. In the present instance, this occurs after one complete revolution of the disk 24 and there is formed in its periphery a notch or recess 28. The arm 23 on the pawl 21 carries a roller 30 that rides on the periphery of the disk 24 and holds the pawl out of engagement with the ratchet 20, as shown in Fig. 4, except when the said roller 30 falls into the recess 28 at which time it allows the pawl 21 to go into engagement with the ratchet 20 as in Fig. 3. Once the pawl is rocked away from the ratchet, it is prevented from going in again even before the measuring roll 27 and its pinion 26 are turned because the disk 24 has a limited rotary movement on the gear 25 gaged by a pin 31 on the latter working in a short slot 32 in the disk. A spring 33 engages the pin 31 and also a pin 34 fixed to the disk 24. When this spring is under tension as in Fig. 3, and the pawl 21 is rocked out of engagement with the ratchet 20, the disk rotates a short distance to the right as shown in Fig. 4 and the roller 30 on the pawl cannot return to the recess 28 but rests upon the periphery of the disk preventing the return of the pawl to engaging position.

Attached to the movable finger-piece 11 of the thrust member 9 of the cable release is an extension or slide 35 having two ears 36 and 37 thereon. Confined between these ears is another arm 38 on the pawl 21 which arm is provided with a thumb-piece or button 39 that projects through a slot 40 in a casing 41 on the outside of the body 1 which casing incloses the mechanism heretofore described.

The operation is as follows:

The parts being in the normal position of Fig. 3, it is assumed that the film has been threaded into the camera and advanced sufficiently for the first picture area to be in the focal plane. The pawl 21 is in engagement with the ratchet 20 and hence the operator cannot make the mistake of again winding the film which is ready for exposure. Upon pressing together the finger-pieces 10 and 11 the shutter is actuated and the film exposed. The arm 38 of the pawl is moved by the ear 36 on the slide 35 of finger-piece 11 so that pawl 21 is disengaged from ratchet 20 as shown in Fig. 4. As soon as the roller 30 leaves recess 28 the disk 24 moves relatively to the gear 25 as previously explained and the pawl cannot go in again. The film winding mechanism is therefore unlocked but the shutter is locked against another actuation because this position of the pawl holds the arm 38 elevated and the ear 37 on slide 35 prevents it from returning the operating member 11. The next operation must therefore be a winding movement and no mistake can be made of re-exposing the film in the focal plane.

The winding is proceeded with, the crank 18 being turned to the left as shown by the arrows in the figures. The measuring roll 27 through its pinion 26 turns the gear 25 and with it the disk 24 until the roller 30 on the pawl again drops into the recess 28. When this occurs the pawl engages the ratchet 20 and locks the winding spool 13 against further winding movement, said pawl being actuated by the spring of finger-piece 11. This spring is superior to spring 33 so that as the pawl goes in it rotates disk 24 sufficiently to the right to place spring 33 under tension and move the pin 31 and slot 32 relatively from the position of Fig. 4 to the normal position of Fig. 3. The shutter is then free and the exposure of the new length of film may be proceeded with and this length of film is prevented, through the locking of the winding mechanism, from being carried out of the focal plane until it is exposed.

When threading the film into the camera, the shutter is actuated to cause the parts to assume the position of Fig. 3. A sliding latch 42 guided upon headed pins 43 and provided with a thumb piece 44 projecting through a slot 45 to the exterior of the casing 41 is then utilized to lock the gear 25 while the lead end of the film is being wound upon the spool 13 and the first picture area adjusted in the field of exposure. At the same time a finger $42^x$ on the latch locks the disk 24 by engaging a notch $42^y$ in its periphery to maintain it in fixed relationship to the gear. This causes the film to slide idly over the measuring roll 27 without turning the disk 24 through the medium of the gear 25 and neither can the disk move relatively to the gear 25 to carry the recess 28 from a position opposite roller 30. Therefore, when the preliminary movements of the film have been completed, the pawl can move straight back to the normal position of Fig. 3 and upon releasing the latch 42, the next normal displacement of the pawl to unlock the winding means is accompanied by the shifting of the disk 24 in the manner first described. In the preliminary winding of the film during the operation of the latch 42, the pawl is disengaged manually by means of the thumb piece 39.

The finger-pieces 10 and 11 for operating the shutter extend through an opening 47 in the casing 41 which otherwise houses all of the mechanism with the exception of the crank 18 and preferably the margins of this opening 47 are flanged downwardly at 48 to seal the interior of the casing at this point. The parts within the casing are preferably carried by a mounting or base plate 49 permitting them to be assembled before being applied to the camera body.

I claim as my invention:

1. In a film camera, the combination with a winding roll, a film driven measuring roll, a winding device for the film roll embodying a ratchet and a rotary element driven by the measuring roll and having a recess, of a pawl adapted to coöperate with the ratchet to lock the winding device, said pawl having a portion in engagement with the periphery of the rotary element to hold the pawl disengaged from the ratchet and being adapted to engage the ratchet when said portion coöperates with the recess.

2. In a film camera, the combination with a winding roll a film driven measuring roll, a winding device for the film roll embodying a ratchet, a gear driven by the measuring roll, a disk carried with the gear having a recess in its periphery and having a limited rotary movement relatively to the gear, and a spring for normally holding the disk at such limit of movement, of a pawl adapted to coöperate with the ratchet to lock the winding device, said pawl having a portion in engagement with the periphery of the disk to hold the pawl disengaged from the ratchet and being adapted to engage the ratchet when said portion coöperates with the recess.

3. In a film camera, the combination with a film winding mechanism, a locking member therefor, and a film measuring device controlling the locking member, of a shutter and a shutter operating member embodying a slide coöperating with the locking member to move it to inoperative position when the shutter is operated and to be itself locked by the locking member until the latter is released by the measuring roll.

4. In a film camera, the combination with a winding roll, a film driven measuring roll, a winding device for the film roll, a gear driven by the measuring roll, a disk carried with the gear having a recess in its periphery and having a limited rotary movement relatively to the gear, a spring for normally holding the disk at such limit of movement and a locking member for the winding device having a portion in engagement with the periphery of the disk to hold the locking member disengaged from the winding device, said locking member being adapted to engage the winding device when said portion coöperates with the recess in the disk, of a shutter, and a shutter operating member coöperating with the locking member to move it to inoperative position when the shutter is operated and to be itself locked by the locking member until the latter is released by the measuring roll.

5. In a film camera, the combination with a winding roll, a winding device therefor, and a shutter, of a lock for the shutter arranged under the control of the winding device, said lock being adapted to also lock the winding device under the control of the shutter, and means for manually releasing said lock independently of said control.

6. In a film camera, the combination with a film winding device, a shutter having an operating member, of a lock operative upon one of said elements at the instance of the other and a latch for maintaining the parts in a neutral position during adjustments of the winding mechanism.

7. In a film camera, the combination with a winding roll, a film driven measuring roll, a winding device for the film roll, a gear driven by the measuring roll, a disk carried with the gear having a recess in its periphery and having a limited rotary movement relatively to the gear, a spring for normally holding the disk at such limit of movement and a locking member for the winding device having a portion in engagement with the periphery of the disk to hold the locking member disengaged from the winding device, said locking member being adapted to engage the winding device when said portion coöperates with the recess in the disk, of a shutter, and a shutter operating member coöperating with the locking member to move it to inoperative position when the shutter is operated and to be itself locked by the locking member until the latter is released by the measuring roll, and a latch adapted to lock both the gear and disk during adjustments of the winding mechanism.

8. In a film camera, the combination with a winding roll, a film driven measuring roll, a shutter, a shutter operating member and means released by the shutter operating member for locking the winding roll, of a controlling device driven by the measuring roll adapted to hold out the locking means when released and to cause its reëngagement after a predetermined movement of the measuring roll and a latch for holding the controlling device in a neutral position during preliminary movements of the winding roll.

ROBERT KROEDEL.

Witnesses:
HELEN M. FRASER,
MARGARET DUIGNAN.